US008160807B2

(12) United States Patent
Nogawa et al.

(10) Patent No.: US 8,160,807 B2
(45) Date of Patent: Apr. 17, 2012

(54) INFORMATION PROCESSING DEVICE, INFORMATION PROCESSING SUPPORTING SERVER AND INFORMATION PROCESSING SYSTEM

(75) Inventors: Tadafumi Nogawa, Minato-ku (JP); Satoshi Murata, Minato-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 578 days.

(21) Appl. No.: 12/374,906

(22) PCT Filed: Jul. 13, 2007

(86) PCT No.: PCT/JP2007/064031
§ 371 (c)(1),
(2), (4) Date: Jan. 23, 2009

(87) PCT Pub. No.: WO2008/013074
PCT Pub. Date: Jan. 31, 2008

(65) Prior Publication Data
US 2009/0254737 A1 Oct. 8, 2009

(30) Foreign Application Priority Data
Jul. 28, 2006 (JP) ................................ 2006-205684

(51) Int. Cl.
*G01C 21/32* (2006.01)
*G06F 19/00* (2011.01)

(52) U.S. Cl. ............................ 701/200; 70/201; 70/204

(58) Field of Classification Search ........................ None
See application file for complete search history.

(56) References Cited

U.S. PATENT DOCUMENTS 5,289,184 A 2/1994 Suzuki
6,208,932 B1 * 3/2001 Ohmura et al. ............... 701/200
2005/0004989 A1 1/2005 Satterfield et al.
2005/0162284 A1 * 7/2005 Hanebrink ............... 340/995.13

FOREIGN PATENT DOCUMENTS

EP 1603066 A1 12/2005
(Continued)

OTHER PUBLICATIONS

Asakura, Teruhiko et al., "Lotusphere 98 Shosai Report Domino/Notes R5.0 Debut," *Lotus Notes Magazine*, vol. 17:45 (1998).

(Continued)

*Primary Examiner* — Vivek Koppikar
*Assistant Examiner* — Trang Nguyen
(74) *Attorney, Agent, or Firm* — Nelson Mullins Riley & Scarborough LLP; Anthony A. Laurentano

(57) ABSTRACT

In information processing device or the like is provided to output a suitable form of information from a view point of user's non-feeling of trouble. In the information processing system, whether a user issues an output instruction or not is confirmed only with respect to information that is not extracted out of information stored in a first storing unit (211) and information that is not output out of information stored in a second storing unit (212) and the importance of which is not less than the standard value. Thus, it is avoidable for a user to coerce an output instruction or non-output instruction for information that is less important than the standard value even in the case that the information has been distributed or broadcasted from a distributing information server (100) and has been output or non-output information.

7 Claims, 4 Drawing Sheets

FOREIGN PATENT DOCUMENTS

| | | | |
|---|---|---|---|
| FR | 2815736 | A1 | 4/2002 |
| JP | 7-288544 | | 10/1995 |
| JP | 11-98173 | | 4/1999 |
| JP | 11-196180 | | 7/1999 |
| JP | 2002-41414 | | 2/2002 |
| JP | 2002-304352 | | 10/2002 |
| JP | 2003-6111 | | 1/2003 |
| JP | 2003-101552 | | 4/2003 |
| JP | 2003-122676 | | 4/2003 |
| JP | 2003-337782 | | 11/2003 |
| JP | 2004-21596 | | 1/2004 |
| JP | 2004-94700 | | 3/2004 |
| WO | 2006/068452 | A1 | 6/2006 |

OTHER PUBLICATIONS

International Preliminary Report on Patentability for Application No. PCT/JP2007-064031, dated Feb. 3, 2009.

Asakura, Teruhiko et al., "Lotusphere 98 Shosai Report Domino/Notes R5.0 Debut," *Lotus Notes Magazine*, vol. 17:54 (1998).

International Search Report for Application No. PCT/JP2007/064031, dated Aug. 7, 2007.

Japanese Office Action for Application No. 2006-205684, dated May 25, 2010.

European Supplementary Search Report for Application No. 07790811, dated Mar. 8, 2010.

* cited by examiner

INFORMATION PROCESSING DEVICE, INFORMATION PROCESSING SUPPORTING SERVER AND INFORMATION PROCESSING SYSTEM

PRIORITY CLAIM

The present application is a 35 U.S.C. 371 national stage filing of International Patent Application No. PCT/JP2007/064031, filed on Jul. 13, 2007, which is based on and claims the priority benefit of Japanese Patent Application 2006-205684 filed on Jul. 28, 2006, the contents of which are incorporated herein by reference in its entirety.

BACKGROUND OF THE INVENTION

1. Field of the Invention

The present invention relates to an information processing device mounted in a mobile device, an information processing supporting server which supports an information processing performed by the information processing device via communication with the information processing device, and an information processing system composed of the information processing device and the information processing system.

2. Description of the Related Art

There has been disclosed an art (for example, refer to Claim 3, paragraph 0061 to paragraph 0063 in Japanese Patent Laid-open No. 2003-101552) which determines, by using a computer system mounted in a vehicle, whether the vehicle is a recall subject according to a vehicular information designating vehicles for recalling delivered from an information center and an ID of the present vehicle; and displays an information related to vehicle recall on a display device in the case where the present vehicle is a recall subject.

However, various information such as recall information, commercial information, road traffic information, weather information and the like, which are displayed on the display device, include not only information with high usability but also information with low usability to a user. Therefore, it may make the user feel troublesome whether to display or not to display all the information on the display device is forcibly demanded without limit.

SUMMARY OF THE INVENTION

The present invention has been accomplished in view of the aforementioned problems, and it is therefore an objective of the present invention to provide an information processing device and the like which may output an information in a suitable form without making a user feel troublesome.

According to a first aspect of the present invention, there is provided an information processing device, which is mounted in a mobile device, for outputting information delivered or broadcasted from an information processing supporting server, including: a first processor performing a first processing which receives information delivered or broadcasted from the information processing supporting server and tagged with a level of importance, and stores the information in a first storing unit; and a second processor performing a second processing which extracts the entire un-extracted information (information that has not been extracted) from the information stored in the first storing unit, selectively extracts information which has not been outputted and has a level of importance equal to or greater than a reference value from the information which is stored in a second storing unit and tagged with an output status and a level of importance, confirms whether there is a presence of an output instruction issued by a user to each of the extracted information, outputs the information to which the output instruction has been issued among the extracted information, tags an output history on the extracted information, and stores the extracted information in the second storing unit.

According to the first aspect of the present invention, it is only necessary to confirm the presence of the output instruction issued by the user on those information including the un-extracted information of the information stored in the first storing unit and the information stored in the second storing unit which has not been outputted and has a level of importance equal to or greater than the reference value. According thereto, among the information delivered or broadcasted from the information processing supporting server, an instruction whether or not to output information which has been outputted and information which has not been outputted but has a level of importance lower than the reference value is prevented from being demanded forcibly from the user. In other words, whether to display or not to display all the information on the display device is prevented from being forcibly demanded from the user without limit, thereby, it is possible for the user to recognize the information without feeling troublesome.

The information processing device of a second aspect of the present invention is dependent on the information processing device of the first aspect, wherein the first processor performs the first processing when a first event is detected.

According to the information processing device of the second aspect, by adequately setting the first event, the information delivered or broadcasted from the information processing supporting server may be received and stored in the first storing unit adequately. The first event includes, for example, a predefined operation performed by a user on the information processing device.

The information processing device of a third aspect of the present invention is dependent on the information processing device of the first aspect, wherein the second processor performs the second processing when a second event is detected.

According to the information processing device of the third aspect, by adequately setting the second event, the information may be adequately extracted from the first storing unit and the second storing unit and the presence of output instruction issued by a user to the extracted information may be confirmed adequately. The second event includes, for example, actuation of the mobile device or of the information processing device.

The information processing device of a fourth aspect of the present invention is dependent on the information processing device of the first aspect, wherein the second processor confirms whether there is a presence of the output instruction to each of the extracted information according to a sequence related to the level of importance of each of the extracted information.

According to the information processing device of the fourth aspect, whether there is a presence of the output instruction to each of the information may be confirmed according to the sequence in higher level of importance. Therefore, the information with higher level of importance can be recognized by a user early and be outputted early.

The information processing device of a fifth aspect of the present invention is dependent on the information processing device of the first aspect, wherein the second processor recognizes whether an elapsed time calculated from a timing when each of the information stored in the second storing unit is received by the first processor, or an elapsed time calculated from a timing when each of the information is stored in the second storing unit is greater than a predefined time limit, and deletes or discards the information on a condition when the elapsed time is recognized greater than the time limit.

According to the information processing device of the fifth aspect, by deleting old information which is not needed by a user in high probability, the storing capacity in the second storing unit held for the old information can be saved or efficiently utilized.

The information processing device of a sixth aspect of the present invention is dependent on the information processing device of the fifth aspect, wherein the second processor recognizes the time limit longer with an increment of the level of importance of the information.

According to the information processor of the sixth aspect, the higher the level of importance of the information is, the longer time the information will be reserved. Thereby, it is more possible for the information with higher level of importance to be accessed by a user.

An information processing supporting server of a seventh aspect of the present invention which supports an information processing performed by an information processing device mounted in a mobile device via communication with the information processing device, includes: a first supporting processor which recognizes a device identifier of the information processing device or the mobile device in which the information processing device is mounted according to the communication with the information processing device, and searches an information defined on the basis of the device identifier in a supporting information storing unit; and a second supporting processor which delivers the searched information obtained by the first supporting processor to the information processing device which is identified according to the device identifier, or the information processing device mounted in the mobile device which is identified according to the device identifier.

According to the information processing supporting server of the seventh aspect, it is possible to deliver the information defined according to a device identifier for identifying the mobile device or the information processing device mounted in the mobile device to the information processing device and to output the information by the information processing device.

An information processing system of an eighth aspect of the present invention includes: an information processing device mounted in a mobile device, and an information processing server which supports an information processing performed by the information processing device via communication with the information processing device, wherein the information processing device includes: a first processor performing a first processing which receives information delivered or broadcasted from the information processing supporting server and tagged with a level of importance, and stores the information in a first storing unit; and a second processor performing a second processing which extracts the entire un-extracted information from the information stored in the first storing unit, selectively extracts information which has not been outputted and has a level of importance equal to or greater than a reference value from the information which is stored in a second storing unit and tagged with an output status and a level of importance, confirms whether there is a presence of an output instruction issued by a user to each of the extracted information, outputs the information to which the output instruction has been issued among the extracted information, tags an output history on the extracted information, and stores the extracted information in the second storing unit, and the information processing supporting server includes: a first supporting processor which recognizes a device identifier of the information processing device or the mobile device in which the information processing device is mounted according to the communication with the information processing device, and searches an information defined on the basis of the device identifier in a supporting information storing unit; and a second supporting processor which delivers the searched information obtained by the first supporting processor to the information processing device which is identified according to the device identifier, or the information processing device mounted in the mobile device which is identified according to the device identifier.

According to the information processing system of the eighth aspect, whether to display or not to display all the information on the display device is prevented from being forcibly demanded from the user without limit, thereby, it is possible for the user to recognize the information without feeling troublesome.

DETAILED DESCRIPTION OF THE PREFERRED EMBODIMENTS

Embodiments of an information processing device, an information-processing supporting server, and an information processing system of the present invention will be described in detail with reference to the drawings.

The configuration of the information processing system according to the present invention will be described with reference to FIG. 1.

Figure 1:
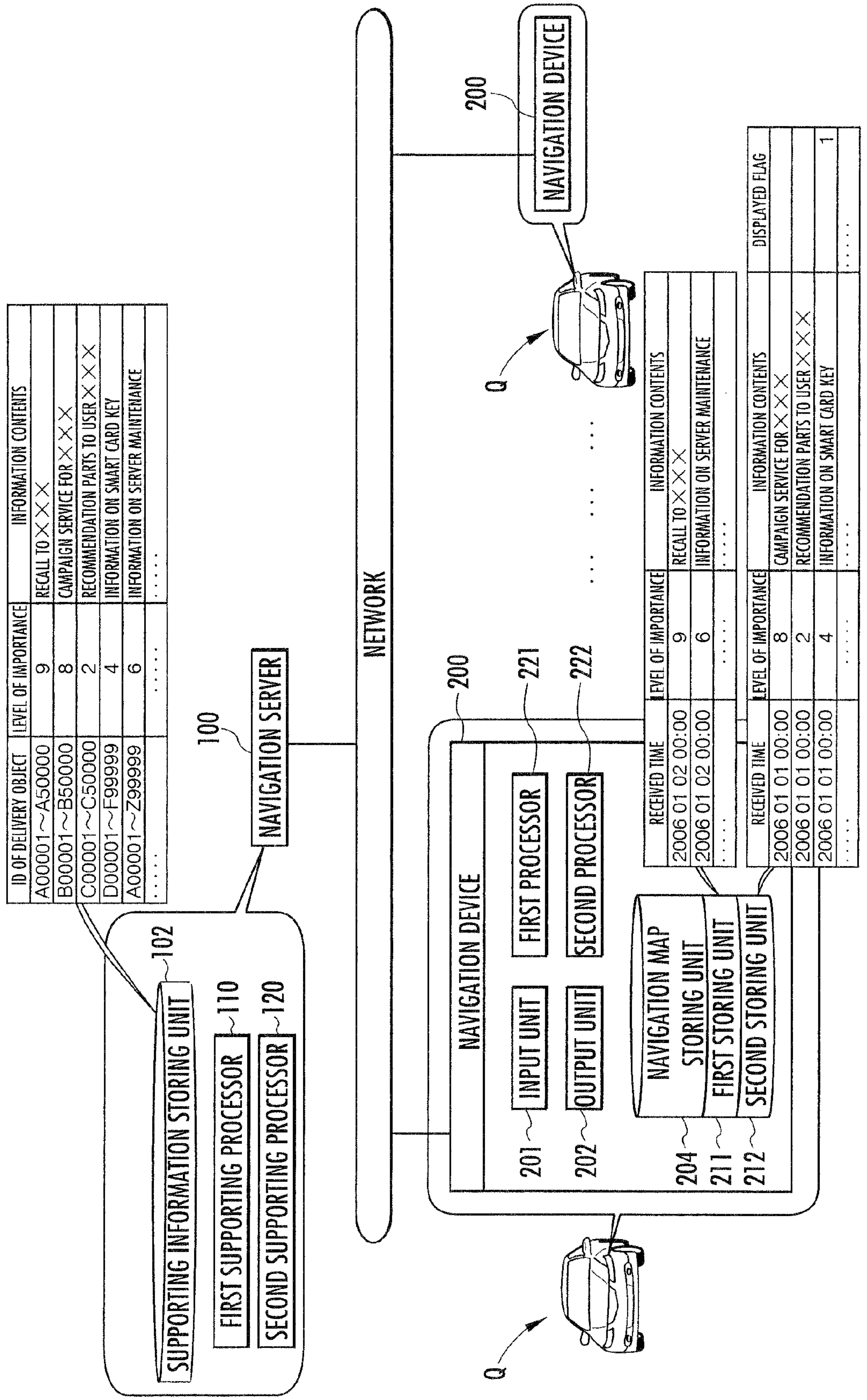
FIG. 1 is a configuration diagram illustrating a traffic information processing system of the present invention.

The information processing system illustrated in FIG. 1 is comprised of a navigation server (information processing supporting server) 100, and a navigation device (information processing device) 200 mounted in a vehicle (mobile device) Q.

The navigation server 100 is comprised of one or a plurality of server computers (comprised of CPU, ROM, RAM, I/O and the like). The navigation server 100 includes a supporting information storing unit 102, a first supporting processor 110, and a second supporting processor 120. The supporting information storing unit 102 memorizes or stores a vehicular identification number VIN (or ID) serving as a delivery address of information of the vehicle Q, a supporting information tagged with a level of importance correspondingly and a corresponding relationship therebetween. The vehicular identification number VIN includes all information which may be used to identify the characteristics, such as vehicular production number, year's model, type, specifications and the like of the vehicle Q. Note that the supporting information storing unit 102 may be configured as a data base server separate from the navigation server 100. In the supporting information, besides recall information, all the other information which may be used by a user of the mobile device, such as commercial information, road traffic information, weather information and the like are contained.

The first supporting processor 110 recognizes the vehicular identification number VIN of the vehicle Q via communication with the navigation device 200, and searches the supporting information and the level of importance thereof which are related to the vehicular identification number VIN from the supporting information storing unit 102. The second supporting processor 120, on the basis of the recognition result and searching result by the first supporting processor 110, delivers or broadcasts the information and the level of importance thereof to the navigation device 200 mounted in the vehicle Q.

The navigation device 200 is comprised of an ECU or a computer as hardware mounted in the vehicle Q, and a navigation program which is stored in a memory to provide the computer with various functions as software. Note that the navigation program may be preliminarily installed in the memory (ROM) in the vehicular computer; or the entire or a part of the navigation program may be downloaded or broadcasted from a server (not shown) via a network or satellite broadcasting to the vehicular computer to store in the memory (EEPROM, RAM) or the like thereof at an arbitrary timing when there is a request or the like from the vehicular computer.

The navigation device 200 is provided with an input unit 201, an output unit 202, a navigation map storing unit 204, a first storing unit 211, a second storing unit 212, a first processor 221, and a second processor 222.

The input unit 201 is comprised of operating buttons disposed in a center console or the like in the vehicle Q, touch panel buttons capable of operating a display unit as the output unit 202 by touching, and a microphone. It is possible for a user to perform various settings by operating or vocally instructing the input unit 201. The output unit 202 is the display unit disposed in the center console of the vehicle Q for displaying or outputting map information or the like. The navigation map storing unit 204 is stored with the navigation map information and the like which will be output to the output unit 202. In the navigation map information, the location, shape, posture and the like of each link which comprises a road are displayed in a row of coordinates. Each link is tagged with link-identification information for identifying the link. Even though the definitions on the coordinate row in each of the map information differ to each other due to different specifications and data base configurations between the navigation map information and the supporting map information, by tagging common link-identification information to an identical link, it is possible to match the links.

The first storing unit 211 memorizes supporting information tagged with "level of importance" and "received time". The second storing unit 212 memorizes information tagged with "level of importance", "received time", and "flag" which indicates whether or not the information has been displayed on (output to) the output device 202. A flag of "1" is tagged to a piece of information if it has already been displayed.

The first processor 221 performs a first processing. In detail, the first processor 221 receives information which is delivered or broadcasted from the information processing supporting server 100 and is tagged with the level of importance, and stores the information in the first storing unit thereafter.

The second processor 222 performs a second processing. In detail, the second processor 222 extracts the entire information which has not been extracted from the information stored in the first storing unit 211. Moreover, the second processor 222 selectively extracts information which has not been outputted and has a level of importance equal to or greater than a reference value from the information which is stored in the second storing unit 212 and is tagged with an output status and a level of importance. Furthermore, the second processor 222 confirms whether there is an output instruction issued by a user to each of the extracted information, and outputs to the output unit 202 the information to which the output instruction has been issued among the extracted information. Thereafter, an updated output history is attached to the extracted information, which is stored in the second storing unit 212.

Note that "a component serving as hardware "recognizes" information" means that the component performs a possible information processing on a piece of information to prepare the information ready for other information processing, for example, the component receives the information; searches the information in a database or memory or retrieves the information from a database or memory; calculates, estimates, configures, determines, searches information or the like via arithmetic processing on the basis of the received basic information or the like; elicits information by decoding packages; and stores in memory or the like the calculated information or the like. In addition, "a component serving as hardware "outputs" information" means that the component outputs the information in form of picture, voice, vibration and the like, which may be recognized by a human by means of five senses thereof such as eyesight, hearing, touch, etc.

Functions of the information processing system with the above-mentioned configuration will be described with reference to FIG. 2 to FIG. 4.

First, a flow of the first processing performed by the first processor 221 will be described with reference to FIG. 2.

Figure 2:
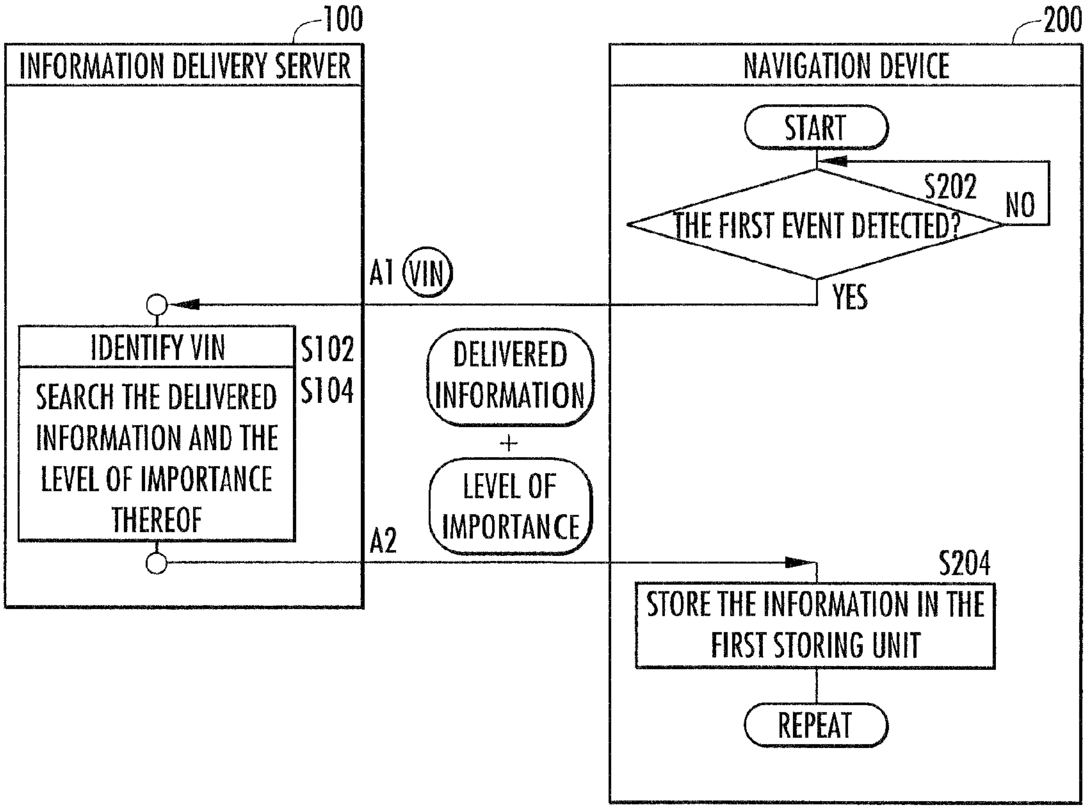
FIG. 2 is a functional diagram illustrating the traffic information processing system of the present invention.

Specifically, in the case where "a first event" is recognized by the first processor 221 (FIG. 2/S202. YES), the first processor 221 transmits the vehicular identification number VIN of the vehicle Q to the information processing supporting server 100 (FIG. 2/arrow A1). The first event includes operations by a user in a predefined mode on the navigation device 200, input of a first predefined signal to the navigation device 200 via the input unit 201, and the like.

When the vehicular identification number VIN is transmitted and reached the information processing supporting server 100, the first supporting processor 110 receives or recognizes the vehicular identification number VIN (FIG. 2/S102). On the basis of the vehicular identification number VIN, the first supporting processor 110 searches in the supporting information storing unit 102 the information whose delivery subject is the vehicle Q and the level of importance thereof (FIG. 2/S104).

Thereafter, the second supporting processor 120 delivers the information and the level of importance thereof searched by the first supporting processor 101 to the navigation device 200 which is mounted in the vehicle Q to be identified according to the vehicular identification number VIN (FIG. 2/arrow 2). Accordingly, to the navigation device 200 which is mounted in the vehicle Q having, for example, a vehicular identification number VIN of "A00100", "Recall to XXX" information tagged with a level of importance of "9", "Server maintenance" information tagged with a level of importance of "6" and the like are delivered (refer to FIG. 1).

After the first processor 221 receives the delivered information from the information processing supporting server 100, it stores the information in the first storing unit 211 (FIG. 2/S204). Accordingly, for example the "Recall to XXX" information received at "0:00 2006/01/02" and tagged with a level of importance of "9", the "Server maintenance" information tagged with a level of importance of "6" received at the same time, and the like are stored in the first storing unit 211 (refer to FIG. 1).

Subsequently, a flow of the second processing performed by the second processor 222 will be described with reference to FIG. 3.

Figure 3:
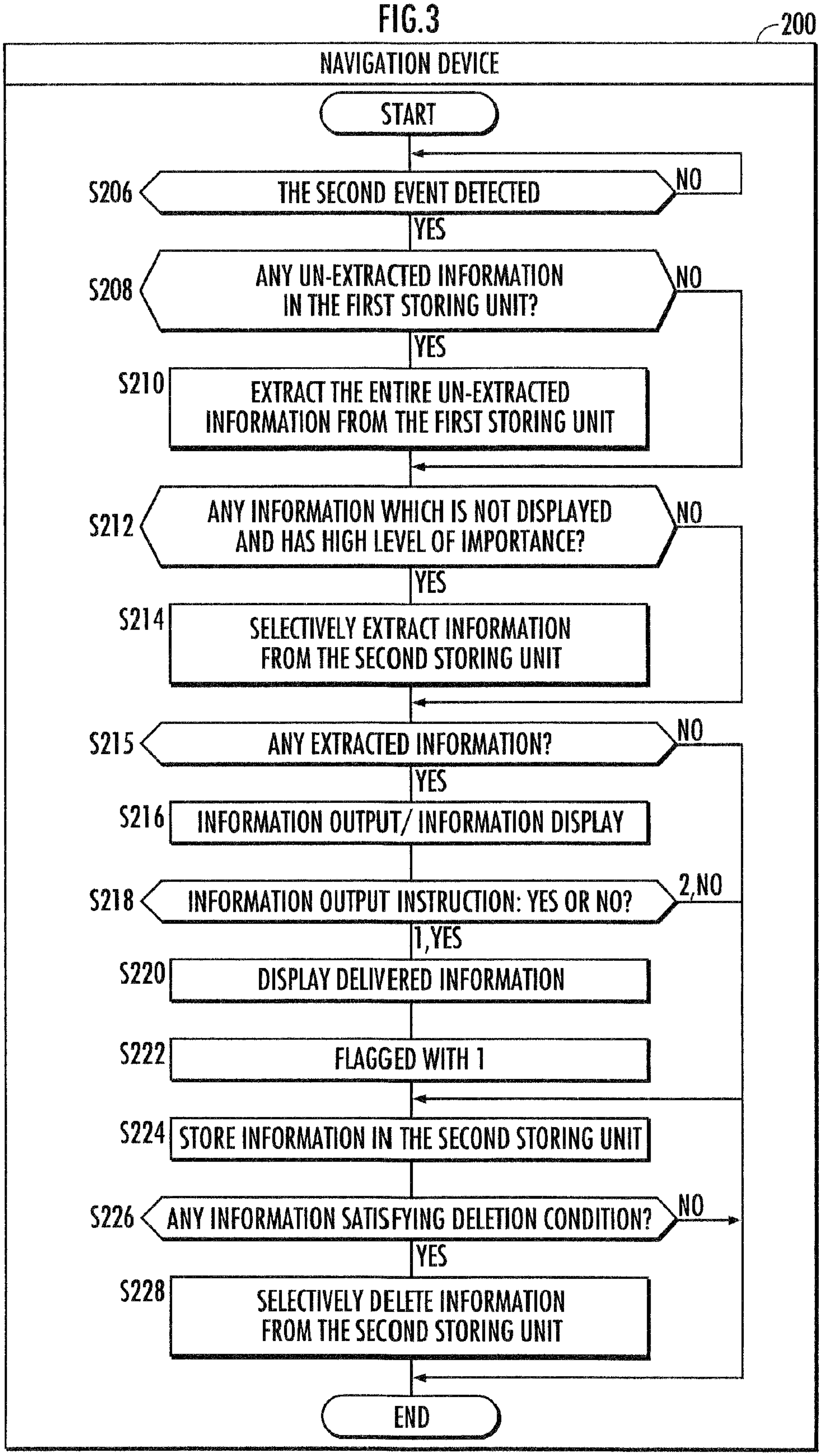
FIG. 3 is a functional diagram illustrating the traffic information processing system of the present invention.

Specifically, in the case where "a second event" is recognized by the second processor 222 (FIG. 3/S206 . . . YES), the second processor 222 determines whether there is un-extracted information (i.e., information that has not been extracted yet) existing in the information stored in the first storing unit 211 (FIG. 3/S208). After the information stored in the first storing unit 211 is extracted by the second processor 222, it will be erased or deleted from the first storing unit 211. Therefore, at this time, the entire information stored in the first storing unit 211 is recognized as un-extracted information. The second event includes the switching from OFF to ON of an ignition switch of the vehicle Q, the actuation of the navigation device 200 when the navigation device is electrified (switching from ACC OFF state to ACC ON state). Furthermore, the second event includes various events which may be performed under appropriate circumstances or at appropriate timings from the viewpoint of providing information to a user, such as operations on vehicular devices such as the navigation device 200, a hand-free communication device or the like in a predefined mode, use of seatbelt in the driver's seat by the driver, input of a second predefined signal to the navigation device 200 via the input unit 201 and the like.

In the case where the second processor 222 determines that there is un-extracted information in the information stored in the first storing unit 211 (FIG. 3/S208 . . . YES), the second processor 222 extracts the un-extracted information from the first storing unit 211 (FIG. 3/S210). Thereafter, as aforementioned, the information extracted from the first storing unit 211 is deleted or erased from the first storing unit 211. The information stored in the first storing unit 211 represents the information received by the first processor 221 during a number of times related to the number of times of the first event occurred between a previous second event and a present second event.

Furthermore, the second processor 222 recognizes whether there is information which has not been flagged (not outputted) and has a level of importance equal to or greater than the reference value of, for example, "5" (FIG. 3/S212). In the case where the second processor 222 has recognized that there is information which has not been outputted and has a level of importance equal to or greater than the reference value stored in the second storing unit 212 (FIG. 3/S212 . . . YES), the second processor 212 extracts selectively such information from the information stored in the second storing unit 212 (FIG. 3/S214). Thereafter, the second processor 222 determines whether there is presence of information extracted from either one or both of the first storing unit 211 and the second storing unit 212 (FIG. 3/S215). Meanwhile, in the case where the second processor 222 has recognized that there is no information which has not been outputted and has a level of importance equal to or greater than the reference level stored in the second storing unit 212 (FIG. 3/S212 . . . NO), the second processor 222 determines whether there is presence of information extracted from either one or both of the first storing unit 211 and the second storing unit 212 (FIG. 3/S215).

In the case where the second processor 222 has determined that there is presence of information extracted from one or both of the first storing unit 211 and the second storing unit 212 (FIG. 3/S215 . . . YES), an "information output instruction screen" related to the extracted information is displayed on the output unit 202 (FIG. 3/S216). Thereafter, the second processor 222 determines, according to the information output instruction screen, whether there is an output instruction issued by the user or an un-output instruction issued by the user (FIG. 3/S218). In the case where the second processor 222 has recognized that the output instruction has been issued by the user (FIG. 3/S218 . . . 1), the second processor 222 displays on the output unit 202 the information that output instruction has been issued (FIG. 3/S220).

Figure 4A:
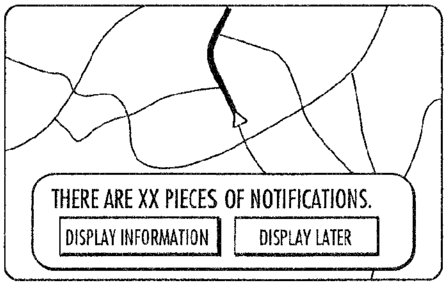
FIG. 4 is a functional diagram illustrating the traffic information processing system of the present invention.

For example, in the case where there are extracted plural pieces of information from the information storing in the second storing unit 212, as illustrated in FIG. 4A, in addition to a message indicating the numbers of the extracted information, such as "there are OO pieces of notifications" or the like, buttons of "Display information" and "Display later" are also shown on the output unit 202. Note that it is acceptable to display on the output unit 202 a map corresponding to the navigation map information stored in the navigation map storing unit 204 and an icon indicating the present location and moving direction of the vehicle Q and the like, as illustrated in FIG. 4A.

Figure 4B:
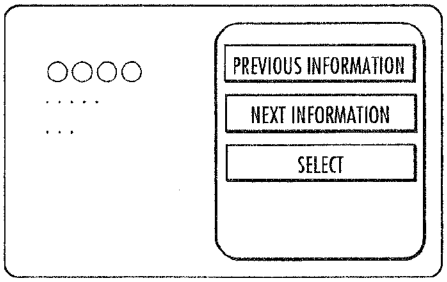

In the drawing illustrated in FIG. 4A, in the case where a user touches the button "Display information" (output instruction is issued) on the screen, the title and contents of one piece of information among a plural pieces of extracted information are displayed on the left side of the screen, and buttons like "The previous information", "The next information" and "Select" are displayed on the right screen, as illustrated in FIG. 4B. On the other hand, in the case where the user touches the button "Display later" (un-output instruction is issued) on the screen illustrated in FIG. 4A, none of the plural pieces of extracted information will be displayed, the original screen containing a map, an icon indicating the present location and moving direction of the vehicle Q and the like will be output.

In the case where the button of "Next information" on the screen illustrated in FIG. 4B is touched (further output instruction is issued), as illustrated in the same FIG. 4B, the title and contents of the next information is displayed on the left side of the screen. And on the right side thereof, the buttons of "The previous information", "The next information" and "Select" are displayed. Note that the button of "The previous information" may not be displayed if there were no previous information existed. Similarly, the button of "The next information" may not be displayed if there were no next information existed. In this way, by touching the button of "The next information" repeatedly, the titles and contents of plural pieces of information are sequentially displayed on the output unit 202 in a display order where information with higher level of importance is set to be displayed first.

Note that the display order of each information may be determined according to the length of time elapsed from the received time of each information by the first processor 221. Furthermore, the titles and contents of plural pieces of information may be arranged and displayed on the output unit 202 at one time in a display order determined according to either the level of importance or the elapsed time from the received time, or both of them.

Figure 4C:
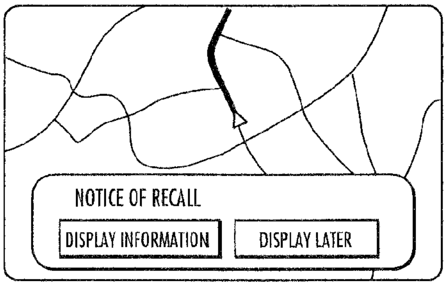

In the case where there is only a single piece of information extracted from the information stored in the second storing unit 212, in addition to the title of the extracted information such as "Notice of recall" or the like, buttons of "Display information" and "Display later" will be displayed on the output unit 202, as illustrated in FIG. 4C.

Figure 4D:
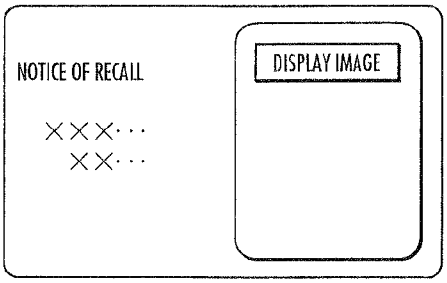

In the case where the button of "Display information" on the screen illustrated in FIG. 4C is touched (output instruction is issued), as illustrated in FIG. 4D, on the left side of the screen, the title and contents of the single piece of information is displayed and a button of "Display image" is displayed on the right side thereof. On the other hand, in the case where the button "Display later" on the screen illustrated in FIG. 4A is touched by the user (un-output instruction is issued), the single piece of extracted information will not be displayed, while the original screen containing a map, an icon indicating the present location and moving direction of the vehicle Q and the like will be output.

Figure 4E:
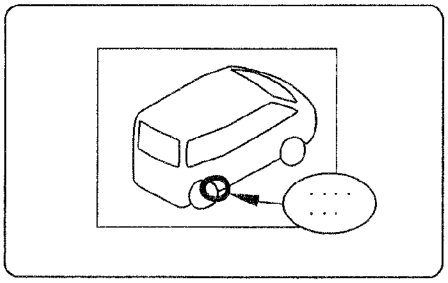

In the case where the button "Display image" on the screen illustrated in FIG. 4D is touched (output instruction is issued), as an example illustrated in FIG. 4E, an image demonstrating a recalling part of the vehicle Q is displayed.

In the case where the second processor 222 outputs an information after recognized the output instruction thereof (FIG. 3/S218 . . . 1, S220), the second processor 222 tags a flag of "1" to the information (FIG. 3/S222) and stores the information in the second storing unit 212 (FIG. 3/S224). In this way, a piece of information, for example, "Information on smart card key" tagged with the received time of "0:00, Jan. 1, 2006", the level of importance of "4" and flag of "1" is stored in the second storing unit 212 (refer to FIG. 1).

On the other hand, in the case where the second processor 222 recognized an un-output instruction on a piece of extracted information (FIG. 3/S218 . . . 2), the second processor 222 stores the extracted information without tagging a flag of "1" thereto (FIG. 3/S224). In this way, apiece of information, for example, "Campaign service for XXX" tagged with the received time of "0:00, Jan. 1, 2006", the level of importance of "8" is stored in the second storing unit 212 without the flag of "1" (refer to FIG. 1).

Further, the second processor 222 determines whether there is a piece of information meeting a "deletion condition" in the information stored in the second storing unit 212 (FIG. 3/S226). It is included in the deletion condition if an elapsed time from the received time is longer than a time limit. The time limit is set longer if a piece of information has a higher level of importance and is set shorter if the information is tagged with a flag of "1" representing that the information has been displayed.

In the case where the second processor 222 has determined that a piece of information meeting the deletion condition is present in the information stored in the second storing unit 212 (FIG. 3/S226 . . . YES), the piece of information is deleted selectively from the second storing unit 212 (FIG. 3/S228).

According to the information processing system which realizes the above-mentioned functions, whether or not an output instruction has been issued by a user is confirmed only on the un-extracted information among the information stored in the first storing unit 211 and the information which has not been outputted and has a level of importance equal to or greater then the reference value among the information stored in the second storing unit 212 (refer to FIG. 3/S208 to S216, FIG. 4A and FIG. 4C). Accordingly, for the information delivered from the supporting information server 100, the output instruction or un-output instruction can be prevented from demanding from a user forcibly on those which has been outputted and those which has not been outputted but has a level of importance below the reference value. In other words, the user may be demanded whether or not to issue the output instruction forcibly without limit on all information. Thereby, the information may be recognized by a user without making the user feel troublesome.

The first processing is performed according to the detection of the first event, therefore, by setting appropriately the first event, it is possible to receive the information delivered from the information processing supporting server 100 and store it in the first storing unit 211 appropriately (refer to FIG. 2/S202).

Further, the second processing is performed according to the detection of the second event, therefore, by setting appropriately the second event, it is possible to extract the information out of the first storing unit 211 and the second storing unit 212 and confirm whether the output instruction has been issued or not to the extracted information adequately (refer to FIG. 3/S206).

Furthermore, it is possible to confirm the output instructions on plural pieces of extracted information from the higher level importance to the lower one, therefore, the presence of information with higher level of importance can be recognized early by the user; accordingly, the information with higher level of importance can be output early (refer to FIG. 4A and FIG. 4B). In addition, in the case where plural pieces of information are outputted at one time, by arranging the plural pieces of information in order, each of the plural pieces of information can be recognized, together with the level of importance thereof, by the user Additionally, the information will be deleted or disposed by the first processor 221 if the elapsed time thereof from the reception is greater than the time limit (refer to FIG. 3/S226 and S228). Moreover, the time limit is set longer, increased with the level of importance of the information; and the time limit is set shorter in the case where a flag of "1" is tagged than the case where the flag of "1" is not tagged. According thereto, the information which is not needed by the user in higher probability will be deleted, thereby saving or utilizing efficiently the capacity of the memory for storing the information.

Although the present invention has been explained in relation to the preferred embodiments and drawings but not limited, it should be noted/it is to be understood that other possible modifications and variations made without departing from the gist and scope of the invention will be comprised in the present invention. Therefore, the appended claims encompass all such changes and modifications as falling within the gist and scope of the present invention.

What is claimed is:

1. An information processing device, which is mounted in a mobile device, for outputting information delivered or broadcasted from an information processing supporting server, comprising:

a first processor performing a first processing which receives information delivered or broadcasted from the information processing supporting server and tagged with a level of importance, and stores the information in a first storing unit; and a second processor performing a second processing which extracts entire un-extracted information from the information stored in the first storing unit as a first candidate, outputs at least a portion of the first candidate as first information if an output instruction has been issued by a user to at least the portion of the first candidate and stores the first information in a second storing unit as output information, stores the first candidate in the second storing unit as non-output information if the output instruction has not been issued to the first candidate, selectively extracts non-output information having a level of importance equal to or greater than a reference value from the second storing unit as a second candidate, outputs at least a portion of the second candidate as second information if the output instruction has been issued to at least the portion the second candidate and stores the second information in the second storing unit as output information, meanwhile stores the second candidate in the second storing unit as non-output information if the output instruction has not been issued to the second candidate.

2. The information processing device according to claim 1, wherein the first processor performs the first processing when a first event is detected.

3. The information processing device according to claim 1, wherein the second processor performs the second processing when a second event is detected.

4. The information processing device according to claim 1, wherein the second processor confirms whether there is a presence of the output instruction to each of the extracted information according to a sequence related to the level of importance of each of the extracted information.

5. The information processing device according to claim 1, wherein the second processor recognizes whether an elapsed time calculated from a timing when each of the information stored in the second storing unit is received by the first processor, or an elapsed time calculated from a timing when each of the information is stored in the second storing unit is greater than a predefined time limit, and deletes or discards the information on a condition when the elapsed time is recognized greater than the time limit.

6. The information processing device according to claim 5, wherein the second processor recognizes the time limit longer with an increment of the level of importance of the information.

7. An information processing system, comprising:

an information processing device mounted in a mobile device, and an information processing server which supports an information processing performed by the information processing device via communication with the information processing device, the information processing device including:

a first processor performing a first processing which receives information delivered or broadcasted from the information processing supporting server and tagged with a level of importance, and stores the information in a first storing unit; and a second processor performing a second processing which extracts entire un-extracted information from the information stored in the first storing unit, as a first candidate, outputs at least a portion of the first candidate as first information if an output instruction has been issued by a user to at least the portion of the first candidate and stores the first information in a second storing unit as output information, stores the first candidate in the second storing unit as non-output information if the output instruction has not been issued to the first candidate, selectively extracts non-output information having a level of importance equal to or greater than a reference value from the second storing unit as a second candidate, and outputs at least a portion of the second candidate as second information if the output instruction has been issued to at least the portion the second candidate and stores the second information in the second storing unit as output information, meanwhile stores the second candidate in the second storing unit as non-output information if the output instruction has not been issued to the second candidate, the information processing supporting server including:

a first supporting processor which recognizes a device identifier of the information processing device or the mobile device in which the information processing device is mounted according to the communication with the information processing device, and searches an information defined on the basis of the device identifier in a supporting information storing unit; and a second supporting processor which delivers the searched information obtained by the first supporting processor to the information processing device which is identified according to the device identifier, or the information processing device mounted in the mobile device which is identified according to the device identifier.

* * * * *